(12) United States Patent
Badr et al.

(10) Patent No.: US 10,341,272 B2
(45) Date of Patent: Jul. 2, 2019

(54) PERSONALITY REPLY FOR DIGITAL CONTENT

(71) Applicant: Google LLC, Mountain View, CA (US)

(72) Inventors: Ibrahim Badr, Zürich (CH); Aayush Kumar, Zürich (CH); Goekhan Hasan Bakir, Zürich (CH); Nils Grimsmo, Adliswil (CH); Bianca Madalina Buisman, Kilchberg (CH)

(73) Assignee: Google LLC, Mountain View, CA (US)

( * ) Notice: Subject to any disclaimer, the term of this patent is extended or adjusted under 35 U.S.C. 154(b) by 47 days.

(21) Appl. No.: 15/587,783

(22) Filed: May 5, 2017

(65) Prior Publication Data

US 2018/0324117 A1 Nov. 8, 2018

(51) Int. Cl.
*G06F 15/16* (2006.01)
*H04L 12/58* (2006.01)

(52) U.S. Cl.
CPC ............ *H04L 51/046* (2013.01); *H04L 51/10* (2013.01)

(58) Field of Classification Search
CPC .............................. H04L 51/046; H04L 51/10
See application file for complete search history.

(56) References Cited

U.S. PATENT DOCUMENTS

| 5,751,286 | A | 5/1998 | Barber et al. |
| 7,647,227 | B1 | 1/2010 | Khosla |
| 7,707,218 | B2 | 4/2010 | Gocht et al. |
| 8,417,712 | B2 | 4/2013 | Narayanan et al. |
| 8,515,765 | B2 * | 8/2013 | Baldwin ................ G10L 15/22 |
| | | | 704/270 |
| 8,958,661 | B2 | 2/2015 | Panda et al. |
| 9,015,049 | B2 | 4/2015 | Baldwin et al. |
| 9,235,864 | B1 * | 1/2016 | Maeng .................. G06Q 50/01 |
| 2011/0255736 | A1 | 10/2011 | Thompson et al. |
| 2013/0212501 | A1 | 8/2013 | Anderson et al. |

* cited by examiner

*Primary Examiner* — Hua Fan
(74) *Attorney, Agent, or Firm* — Fish & Richardson P.C.

(57) ABSTRACT

A computer-implemented method is described. The method includes a computing system receiving an item of digital content from a user device. The computing system generates one or more labels that indicate attributes of the item of digital content. The computing system also generates one or more conversational replies to the item of digital content based on the one or more labels that indicate attributes of the item of digital content. The method also includes the computing system selecting a conversational reply from among the one or more conversational replies and providing the conversational reply for output to the user device.

20 Claims, 4 Drawing Sheets

PERSONALITY REPLY FOR DIGITAL CONTENT

FIELD

The present specification is related to mobile devices.

BACKGROUND

User devices such as mobile smartphones may include digital cameras that capture digital images depicting particular content items. Such user devices may also include a computing system that executes program code for using at least one messaging application to exchange data communications during an electronic conversation. An electronic conversation can include at least two users that exchange data communications which may include the sharing of digital image and video data.

SUMMARY

According to the described technologies, a computing system receives an item of digital content from a user device, such as a digital image that depicts a particular item. The system generates one or more labels that indicate attributes of the item of digital content. At least one label can be descriptive of the particular item depicted in the digital image. The system generates one or more conversational replies to the item of digital content based on the one or more labels that indicate attributes of the item of digital content. The system selects a conversational reply from among the one or more conversational replies and provides the conversational reply for output to the user device.

One aspect of the subject matter described in this specification can be embodied in a computer-implemented method. The method includes, receiving, by a computing system and from a user device, an item of digital content; generating, by the computing system, one or more labels indicating attributes of the item of digital content; based on the one or more labels that indicate attributes of the item of digital content, generating, by the computing system, one or more conversational replies to the item of digital content; selecting, by the computing system and from among the one or more conversational replies, a conversational reply; and providing, for output to the user device, the conversational reply.

These and other implementations can each optionally include one or more of the following features. For example, in some implementations, generating the one or more conversational replies includes: determining, by at least one module, a similarity score that indicates a similarity between the item of digital content and one other item of digital content that is associated with an electronic conversation; and responsive to the similarity score exceeding a threshold similarity score, generating, by the at least one module and based on the other item of digital content, the one or more conversational replies and a confidence score for each conversational reply of the one or more conversational replies; and wherein selecting the conversational reply includes: selecting, from among the one or more conversational replies, a particular conversational reply based on the confidence score for the particular conversational reply.

In some implementations, generating the one or more conversational replies includes: analyzing, by at least one module, content of a content database comprising multiple items of media content, wherein the content is associated with at least one item of media content; determining, by the at least one module, a similarity score that indicates a similarity between at least one label of the one or more labels and the analyzed content; and responsive to the similarity score exceeding a threshold similarity score, generating, by the at least one module and based on a particular item of media content, the one or more conversational replies and a confidence score for each conversational reply of the one or more conversational replies; and wherein selecting the conversational reply includes: selecting, from among the one or more conversational replies, a particular conversational reply based on the confidence score for the particular conversational reply.

In some implementations, the at least one item of media content includes content that is reproduced based on video data, audio data, electronic text data, or digital image data, and wherein the content associated with the at least one item of media content is a quotation of text or speech from media content of the database.

In some implementations, generating the one or more conversational replies includes: determining, by at least one module, a first similarity score that indicates a similarity between at least one label of the one or more labels and a predetermined conversational reply of a reply content database; and responsive to the first similarity score exceeding a threshold similarity score, generating, by the at least one module and based on a particular predetermined conversational reply, the one or more conversational replies and a confidence score for each conversational reply of the one or more conversational replies; and where selecting the conversational reply includes: selecting, from among the one or more conversational replies, a particular conversational reply based on the confidence score for the particular conversational reply.

In some implementations, generating the one or more conversational replies further includes: determining, by the at least one module and based on the one or more labels, a related entity that has a threshold relevance to the item of digital content, wherein the related entity is determined using a knowledge graph; determining, by the at least one module, a second similarity score that indicates a similarity between at least one label of the one or more labels, the determined related entity, and the particular predetermined conversational reply; and responsive to the second similarity score exceeding a threshold similarity score, selecting by the at least one module, a predetermined conversational reply for inclusion with the one or more conversational replies generated by the computing system.

In some implementations, generating the one or more conversational replies includes at least one of: generating, by a first module of the computing system, a first conversational reply and generating a first confidence score for the first conversational reply; and generating, by a second module of the computing system, a second conversational reply and generating a second confidence score for the second conversational reply. In some implementations, generating the first confidence score for the first conversational reply by the first module includes: determining a first relevance parameter that indicates a relevance between the first conversational reply and the item of digital content; and generating the first confidence score based on the first relevance parameter.

In some implementations, generating the second confidence score for the second conversational reply by the second module includes: determining a second relevance parameter that indicates a relevance between the second conversational reply and at least one label of the one or more labels; and generating the second confidence score based on the second relevance parameter. In some implementations, generating the one or more labels indicating an attribute of the item of digital content includes: using a digital image recognition system to analyze the received item of digital content; determining, based on analysis of the received item of digital content, a particular content item of the item of digital content; and generating, based on the determined particular content item, the one or more labels indicating an attribute of the item of digital content.

In some implementations, the item of digital content includes image content received by the computing system from the user device, and the method further includes: selecting a particular number of conversational replies from among the one or more conversational replies based on respective confidence scores of the one or more conversational replies; and providing, for output by the user device, the particular number of conversational replies as a suggested reply to the image content received by the computing system.

In some implementations, providing the conversational reply selected from among the one or more conversational replies includes: the computing system receiving the image content as a communication message of an electronic conversation generated by a messaging application, the electronic conversation including at least one user; providing the particular number of the conversational replies as a suggested reply message to the communication message of the electronic conversation; and receiving, by the computing system, an indication that the at least one user selected a conversational reply from among the particular number of conversational replies as a reply message to the communication message of the electronic conversation.

In some implementations, generating the one or more labels indicating attributes of the item of digital content includes: generating respective confidence scores for each label of the one or more labels, the respective confidence scores each indicating a relevance of a label to an attribute of the item of digital content; and selecting at least one label based on a confidence score of the at least one label exceeding a threshold confidence score.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular implementations and can result in one or more of the following advantages. A computing system according to the described technologies can be configured to generate one or more conversational replies that are descriptive of an item of digital content. For example, the item of digital content can be a digital image that depicts a particular item and a generated conversional reply may either identify the particular item, or may indicate an attribute of the particular item.

In some instances, conversational replies that indicate an attribute of an item of digital content can include text or image content that may be perceived as delightful, pleasant, or pleasing to a user. For example, a computing system can include a database of predetermined conversational replies and at least one generated reply can be selected from among the predetermined conversational replies of the database. The predetermined replies can be curated such that each predetermined conversational reply includes at a portion of text or image content that may be perceived as delightful.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

According to the described technologies, a computing system receives an item of digital content from a user device, such as a digital image that depicts a particular item. The system generates one or more labels that indicate attributes of the item of digital content. For example, the labels can include words or text phrases that are descriptive of the particular item depicted in the digital image. The system generates one or more conversational replies to the item of digital content based on the one or more labels that indicate attributes of the item of digital content. The system selects a conversational reply from among the one or more conversational replies and provides the conversational reply for output to the user device.

Figure 1:
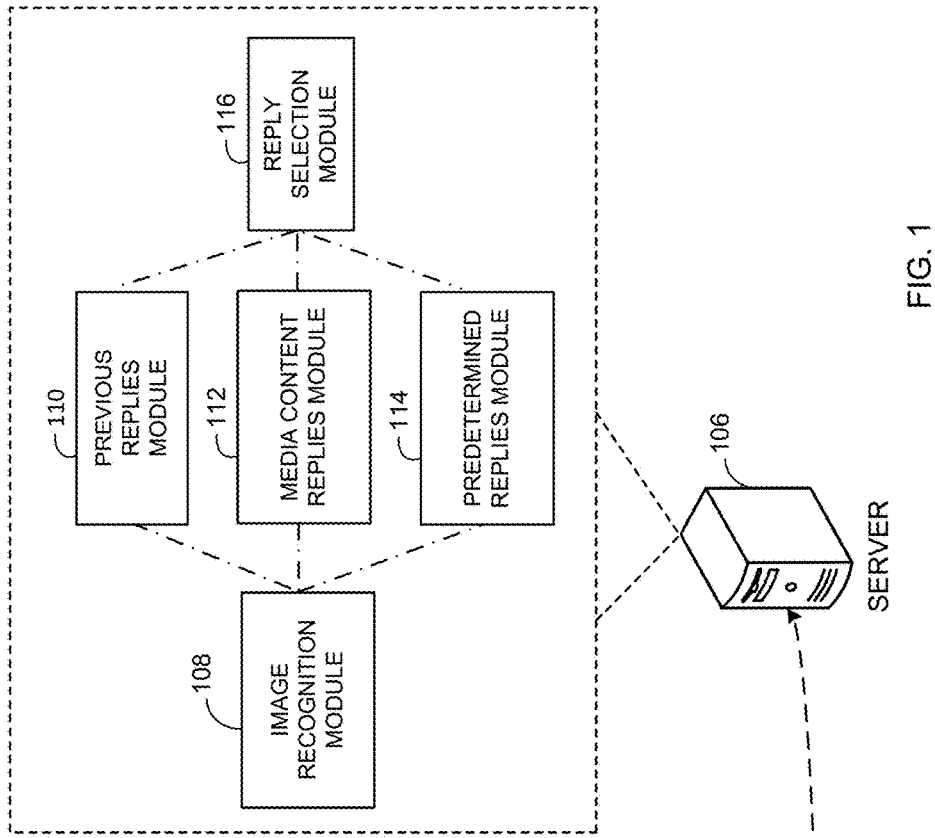
FIG. 1 is an example computing system for generating one or more conversational replies.
Figure 1:
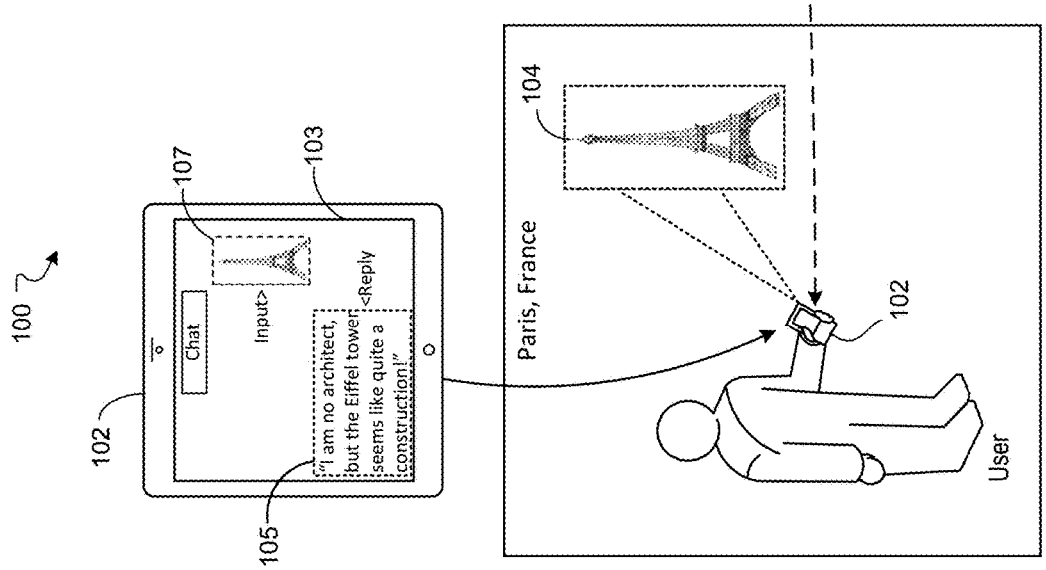

FIG. 1 is an example computing system 100 for generating one or more conversational replies. System 100 generally includes user device 102. Example user devices 102 can include smartphones, mobile computing devices, laptop/desktop computers, tablet devices, smart televisions, gaming consoles, or other related computing device.

User device 102 can include a digital camera, and a user of device 102 can use the digital camera to capture image content. In the context of system 100, the captured image content can be an item of digital content, such as digital image, digital photo, or electronic picture that includes or depicts a particular item/content item 104. As shown in FIG. 1, the user may be located in Paris, France and the captured image content may include a particular content item 104 such as the Eiffel tower that is also located in Paris, FR.

User device 102 can execute program code for enabling a virtual device assistant of the device. In some implementations, a device assistant of user device 102 can be configured to generate one or more replies 105 based on input 107 received by user device 102 or based on an input 107 corresponding to image content captured by user device 104. For example, a camera of user device 102 can capture image content and a computing system of user device 102 can cause the device assistant to generate reply content 105 based on the captured image content.

Current device assistants, or other conventional application programs that process inputs, may generate example reply content that can be perceived by a user as lacking "personality." For example, current device assistants are often configured to provide (or suggest) machine generated replies that often times are not perceived by a user as being delightful or conversational in a tone, nature or substance.

In particular, current device assistants, or related application programs that process digital image content, may provide or suggest a reply such as "I can see images." Although this reply is not inaccurate given the received input, such reply content may be perceived by a user as overly terse and lacking of a certain conversational feel. Thus, this reply might not attract the interest of a user and, hence, may not elicit a response or additional queries from the user.

Referring again to FIG. 1, according to technologies described herein, system 100 can be configured to generate one or more conversational replies that are, for example, at least descriptive of an item of digital content (e.g., a digital photo). For example, system 100 can receive an item of digital content that corresponds to input 107. The item of digital content can be a digital image that depicts a particular item 104, e.g., the Eiffel tower. In contrast to current device assistants or other current programs, a generated conversional reply 105 of system 100 can either identify the particular item 104, or can indicate an attribute of the particular item.

For example, a conversational reply 105 can be "I am no architect, but the Eiffel tower seems like quite a construction!" In particular, conversational reply 105 identifies the particular item 104 as being the Eiffel tower, and includes text content that is descriptive or indicative of an attribute of the Eiffel tower, e.g., that the Eiffel tower is a "construction," such as a physical structure or building. Further, in this implementation, reply 105 is not overly terse and includes content that may be perceived by a user as having more of a conversational tone.

As described in more detail below, in some implementations, in addition to indicating an attribute of an item of digital content, conversational reply 105 can include text or image content that may be perceived as delightful, interesting, pleasant, or pleasing to a user. One or more conversational replies generated by components or devices of system 100 can be provided for output to user device 102 and may be generated for presentation to a user via display 103 of user device 102.

As shown, system 100 includes a computing device/server 106 that receives data signals, e.g., non-transitory propagating signals, from at least one user device 102. As shown, server 106 can include an image recognition module 108, a previous replies module 110, a media content replies module 112, a predetermined replies module 114, and a reply selection module 116. In some implementations, server 106 can include additional or fewer modules and system 100 can include one or more additional servers or computing devices.

Module 108 depicted in FIG. 1 is generally representative of image or data analysis, image feature extraction, and label generation functions that can be executed or performed by server 106. An output of module 108 can include at least one of: i) one or more labels that indicate attributes of an item of digital content provided by, or received from, user device 102; or ii) image data or image pixel data associated with digital image content corresponding to the item of digital content.

Labels and/or image pixel data output by module 108 can be provide to, or received by, one or more of modules 110, 112, and 114. As used herein, labels generated by module 108 can be individual words or text phrases that indicate one or more attributes of an item of digital content or that describe one or more features of an item of digital content. As described in more detail below, each word or text phrase can be assigned a relevance or confidence score that indicates a relevance of a particular word or text phrase (e.g., a label) with regard to attributes or features of a received item of digital content.

Each of modules 110, 112, and 114 depicted in FIG. 1 are generally representative of data analysis and data signal processing functions that can be executed by server 106 to generate one or more conversational replies based on label or image pixel data received from module 108. For example, each of modules 110, 112, and 114 can include one or more databases having multiple content items and can also include program code or logic configured to access the databases and to use the content items to generate respective sets of conversational replies. As described in more detail below, each conversational reply of the respective sets of conversational replies can be assigned a confidence score that indicates a relevance of a particular conversational reply with regard to labels or pixel data received from module 108.

Reply selection module 116 includes program code or logic that can analyze scoring and/or ranking data associated with respective sets of conversational replies generated by each of modules 110, 112, and 114. One or more conversational replies selected by module 116 can be provided for output to user device 102 by server 106. Modules 108, 110, 112, 114, and 116 are each described in more detail below with reference to FIG. 2.

As used in this specification, the term "module" is intended to include, but is not limited to, one or more computers configured to execute one or more software programs that include program code that causes a processing unit(s) of the computer to execute one or more functions. The term "computer" is intended to include any data processing device, such as a desktop computer, a laptop computer, a mainframe computer, a personal digital assistant, a server, a handheld device, a tablet device, or any other device able to process data.

Figure 2:
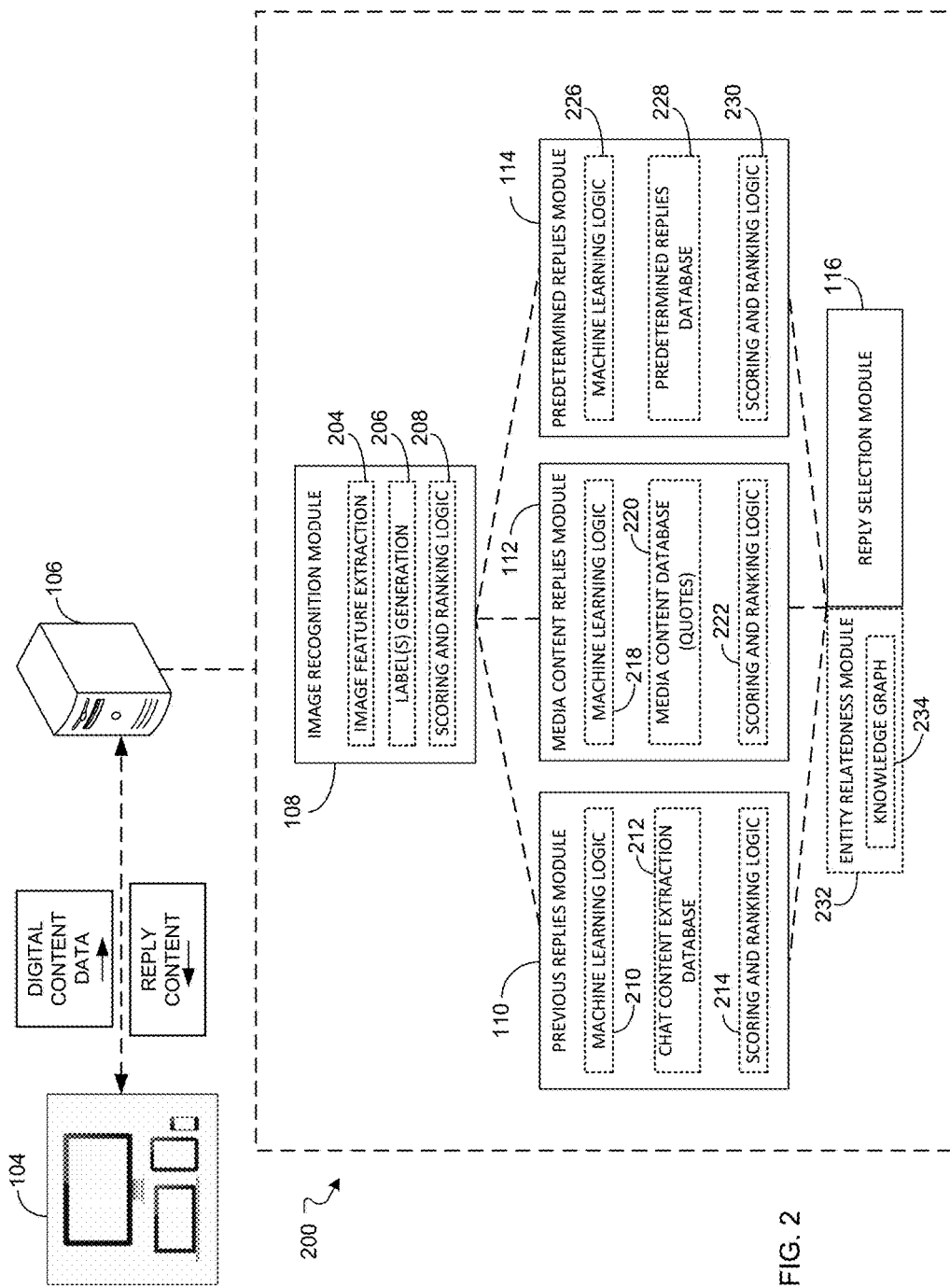
FIG. 2 illustrates a diagram including modules associated with an example computing device of the computing system of FIG. 1.

FIG. 2 illustrates a diagram including an example module grouping 200 associated with computing server 106 of system 100. Module grouping 200 can be disposed within server 106 or can include independent computing devices that collectively are coupled to, and in data communication with, server 106. Module grouping 200 generally includes modules 108, 110, 112, 114, and 116 discussed briefly above with reference to FIG. 1, and an entity relatedness module 234.

In general, described actions or functions of user device 102, server 106, and modules of module grouping 200 can be enabled by computing logic or instructions that are executable by a processor and memory associated with these electronic devices. For example, each of user device 102, server 106, and module grouping 200 (collectively "devices of system 100") can include one or more processors, memory, and data storage devices that cooperatively form a computing system of each device. Execution of the stored instructions can cause one or more of the actions described herein to be performed by devices of system 100.

In other implementations, multiple processors may be used, as appropriate, along with multiple memories and types of memory. For example, user device 102 or server 106 may be connected with multiple other computing devices, with each device (e.g., a server bank, groups of servers, or a multi-processor system) performing portions of the actions or operations associated with the various processes or logical flows described in this specification.

Referring again to FIG. 2, image recognition module 108 can generate one or more labels that indicate attributes of an item of digital content or that describe characteristics of a particular item depicted in the of digital content. For example, image recognition module 108 can execute program code to analyze a digital image of an item of digital content. In response to analyzing the digital image, module 108 can use feature extraction logic 204 to extract one or more features of the digital image. Module 108 can then use label generation logic 206 to generate at least one label that indicates attributes of the digital image or that describe characteristics of a particular item depicted in the digital image.

For example, if a digital image received by module 108 includes a particular content item(s) such as the Eiffel tower, and/or a dog standing in front of the Eiffel tower, then module 108 can use logic 204 to extract image features, or pixel data, that correspond to at least one of: a) the Eiffel tower, or b) the dog. Module 108 can then use label generation logic 206 to generate one or more labels (e.g., words, or text phrases) based on extracted features for Eiffel tower and dog.

Example extracted features that correspond to the Eiffel tower may cause logic 206 to generate one or more example labels such as "Eiffel," "Eiffel tower," "tower," "Paris," "France," or "iron lattice tower." Likewise, example extracted features that correspond to the dog may cause logic 206 to generate one or more example labels such as "dog," "golden retriever," "cocker spaniel," "cute dog," "big cute golden retriever," or "cute cocker spaniel."

Module 108 further includes scoring/ranking logic 208. Logic 208 is used to analyze multiple labels generated using logic 206 and, based on the analysis, generate respective confidence scores for each label of the multiple labels. Each label can be assigned confidence score that indicates a relevance of a particular word or text phrase (e.g., a label) with regard to attributes, or extracted image features, of a received item of digital content.

In some implementations, labels that are more definitive or descriptive of particular attributes or extracted image features of an item of digital content may be assigned a higher confidence score relative to labels that more generic. For example, referencing the above extracted features for the Eiffel tower and the dog, descriptive labels such as "Eiffel" or "Eiffel tower" may receive higher confidence scores when compared to more generic labels such as "tower" or "Paris." Likewise, descriptive labels such as "golden retriever" or "cute cocker spaniel" may receive higher confidence scores when compared to more generic labels such as "dog" or "cute dog."

In some implementations, module 108 can execute program code to generate at least one boundary box that bounds at least one feature of a received digital image or item of digital content. In some instances, at least one label may be generated by module 108 prior to module 108 generating a boundary box that bounds at least one feature of the digital image. In this instance, module 108 can determine if the at least one generated label is descriptive of a feature that is bounded by the boundary box. Labels that are descriptive of features of a boundary box can receive higher confidence scores relative to labels that are not descriptive of features of a boundary box.

In other implementations, a digital image can include at least two features and a first feature can be more prominent within the image than a second feature. A first boundary box can bound the first more prominent feature of the digital image, e.g., the Eiffel tower, while a second boundary box can bound the second less prominent feature of the digital image, e.g., the dog. Labels that are descriptive of the first more prominent feature of the first boundary box can receive higher confidence scores relative to labels that are descriptive of the second less prominent feature of the second boundary box.

Module 108 can generate multiple labels and can use logic 208 to rank each label based on a respective confidence score that is assigned to each label to form a subset of ranked labels. In some implementations, a subset of ranked labels can include at least two labels that have the highest confidence scores from among the respective confidence scores assigned to each of the multiple labels. In other implementations, a subset of ranked labels can include one or more labels having confidence scores that exceed a threshold confidence score.

As noted above, each respective confidence score indicates a relevance of a particular label to an attribute or extracted image feature of the item of digital content. Module 108 can select at least one label based on a confidence score of the at least one label exceeding a threshold confidence score. Module 108 can provide the selected at least one label to one or more of modules 110, 112, and 114. Alternatively, module 108 can select at least one label, of the subset of ranked labels, and provide the selected at least one label to one or more of modules 110, 112, and 114.

Previous replies module 110 generally includes machine learning logic 210, content extraction database 212, and scoring/ranking logic 214. Module 110 can receive at least one of: i) image data or image pixel data associated with digital image content for an item of digital content received by server 106 from user device 102; or ii) one or more labels from module 108 that indicate attributes of an item of digital content received by server 106 from user device 102.

Content extraction database 212 can include multiple other items of digital content ("chat content") that have been extracted from a variety of electronic conversations, or electronic "chats," that occur between at least two users. In some implementations, the electronic conversations can occur via an example messaging or chat application and can include a communication message provided by at least a first user and a reply message provided by at least a second user.

Extracted chat content can include multiple digital content items such as texts, words, text phrases, or digital image data. Module 110 can generate one or more conversational replies based on a similarity between image pixel data received from module 108 and at least one content item of the extracted chat content stored in database 212. In alternative implementations, module 110 can generate one or more conversational replies based on a similarity between at least one received label received from module 108 and at least one content item of the extracted chat content.

For example, referencing the above extracted features for the Eiffel tower and the dog, pixel data can indicate that the Eiffel tower and the dog are particular items included in a digital image received by server 106. Module 110 can then scan or analyze database 212 to identify texts, words, text phrases, or image data having an apparent relation to the Eiffel tower or the dog.

The words, text phrases, and digital pictures/images can be previous replies and other chat messages mined or extracted over-time by system 100 and stored in database 212. The words or text phrases stored in database 212 can include content items such as: "Eiffel tower," "Paris," "France," "golden retriever," "cocker spaniel," or "cute dog." Digital pictures or image data stored in database 212 can include images of a variety dogs, images of the Eiffel tower, or images of a variety of locations in Paris, France.

In some implementations, module 110 uses machine learning logic 210 to compute inferences using an example neural network of system 100. The computed inferences are used to determine digital content items of database 212 that are similar or relevant to the image pixel data of the item of digital content received from user device 102.

Module 110 can use scoring/ranking logic 214 to determine at least one similarity score that indicates a similarity between: i) image pixel data of an item of digital content; and ii) at least one content item of chat content extracted from an electronic conversation. For example, module 110 can determine a similarity score between pixel data for the Eiffel tower and respective images of the Eiffel tower accessed from database 212. Likewise, module 108 can determine a similarity score between pixel data for the Eiffel tower and respective words or text phrases accessed from database 212 that are descriptive of the Eiffel tower.

Module 110 can also determine whether similarity scores exceed a threshold similarity score. In response to determining that one or more similarity scores exceed a threshold similarity score, module 110 can generate one or more conversational replies and a confidence score for each conversational reply.

Module 110 generates the conversational replies based on at least one content item of chat content (e.g., another item of digital content) accessed from database 212. In some implementations, conversational replies generated by module 110 include digital image data from database 212, text data such as words or text phrases from database 212, or a combination of image and text data from database 212.

Module 110 can analyze one or more determined similarity scores and, based on the analysis, generate respective confidence scores for each conversational reply. Each conversational reply can be assigned a confidence score that indicates a relevance between the conversational reply and the image pixel data for the received item of digital content.

In some implementations, determined similarity scores can indicate an extent to which a content item of database 212 is similar or relevant to image pixel data of the received item of digital content. For example, determining the similarity scores can correspond to determining a relevance parameter that indicates a relevance between a conversational reply and an item of digital content received by server 106 from user device 102. Hence, module 110 can generate a confidence score based on a determined relevance parameter.

Similarity scores for content items accessed from database 212 can be ranked based on a numerical value of the score such that scores with larger numerical values (e.g., high similarity scores) are ranked higher than scores with lower numerical values (e.g., low similarity scores). Conversational replies generated from content items of database 212 that have high similarity scores may be assigned higher confidence scores relative to conversational replies generated from content items of database 212 that have low similarity scores.

Module 110 can generate a set of conversational replies and each conversational reply in the set can have a corresponding confidence score. Further, module 110 can use logic 214 to rank each conversational reply in the set based on the corresponding confidence score for the reply.

For example, module 110 can generate a first set of conversational replies. This example first set of conversational replies can include: i) a first reply that includes a close-up image of the Eiffel tower, and/or text that states "wow the Eiffel tower looks really tall up close, don't you think?"; ii) a second reply that includes an image taken several miles away from the Eiffel tower and that shows multiple other buildings in the city of Paris, France, and/or text that states "Paris has so many cool places that surround the tower."; and iii) a third reply that includes an image taken from within the Eiffel tower showing multiple other buildings in the city of Paris, France but the image does not show the Eiffel tower, and/or text that states "Look at all the really nice places to visit that are around the Eiffel tower."

Further, regarding this first set of conversational replies, the first reply might receive an example confidence score of 0.8, the second reply might receive an example confidence score of 0.6, and the third reply might receive an example confidence score of 0.3. The first set of conversational replies can include: a) the first reply being ranked highest, e.g., ranked first out of the three replies, based on the confidence score of 0.8; b) the second reply being ranked between the first reply and the third reply, e.g., ranked second out of the three replies, based on the confidence score of 0.6; and c) the third reply being ranked after the first reply and the second reply, e.g., ranked third or last out of the three replies, based on the confidence score of 0.3.

As described in more detail below, a set of conversational replies generated by module 110, and the corresponding confidence scores for each reply, are provided to module 116 for analysis and selection of a particular conversational reply from among multiple conversational replies. In some implementations, the example first set of conversational replies described above can be provided to module 116 along with ranking data that indicates a ranking of a particular conversational reply relative to other replies in the first set.

Media content replies module 112 generally includes machine learning logic 218, media content database 220, and scoring/ranking logic 222. Module 112 can receive one or more labels from module 108 that indicate attributes of an item of digital content received by server 106 from user device 102.

Media content database 220 can include multiple other items of digital content ("media content") that have been extracted or reproduced from a variety of different types of media content such as films or video data, music or audio data, books/articles/publications text data, or other forms of digital text, image or video data. Media content items of database 220 includes multiple quotes, e.g., texts, words, or text phrases, relating to content and data extracted or produced from digital text, image or video data stored in database 212.

Module 112 can generate one or more conversational replies based on a similarity between labels received from module 108 and at least one media content item stored in database 220. For example, referencing the above extracted features for the Eiffel tower and the dog, one or more labels can include text phrases or words such as "Eiffel tower" and "cocker spaniel." Module 112 can then scan or analyze database 220 to identify quotes (e.g., text content) or other media content relating to texts, words, or text phrases that have an apparent relation to "Eiffel tower" or "cocker spaniel."

Quotes, words, text phrases, or other media content of database 220 can be content items, e.g., from movies, television shows, songs, books, or magazines, that have been mined or extracted over-time by system 100. The quotes, words, or text phrases stored in database 220 can include content items such as: "Eiffel tower," "Paris," "France," "golden retriever," "cocker spaniel," or "cute dog." Thus, at least one media content item can be related to, or descriptive of, particular items depicted in a digital image received from user device 102. Further, as noted above, the at least one media content item can be another item of digital content that is distinct from the item of digital content received by server 106 from user device 102.

In some implementations, module 112 uses machine learning logic 218 to compute inferences using an example neural network of system 100. The computed inferences are used to determine media content items of database 220 that are similar or relevant to the labels generated by module 108, and that indicate an attribute of the item of digital content received from user device 102.

Module 112 can use scoring/ranking logic 222 to determine at least one similarity score that indicates a similarity between: i) the one or more labels indicating an attribute of an item of digital content; and ii) at least one media content item stored in database 220. For example, module 112 can determine a similarity score between a label including "Eiffel tower" and respective quotes, words, text phrases, or other media content relating to Eiffel tower accessed from database 220.

In some implementations, module 112 can execute program code for data matching and data comparison processes such as entity matching, n-gram similarity, phrase matching, and feature similarity, to indicate a threshold level of similarity between labels provided by module 108 and media content items accessed from database 220. Module 112 can then generate a similarity score based on an outcome of the data matching process.

Module 112 can also determine whether similarity scores exceed a threshold similarity score. In response to determining that one or more similarity scores exceed a threshold similarity score, module 112 can generate one or more conversational replies and a confidence score for each conversational reply. Module 112 generates the conversational replies based on at least one media content item (e.g., a quote or other item of digital content) accessed from database 220. In some implementations, conversational replies generated by module 112 include quotes or text data accessed from database 220.

Module 112 can analyze one or more determined similarity scores and, based on this analysis, generate respective confidence scores for each conversational reply. Each conversational reply can be assigned a confidence score that indicates a relevance between the conversational reply and labels from module 108 that indicate an attribute of the received item of digital content. In some implementations, determined similarity scores can indicate an extent to which a media content item of database 220 is similar or relevant to labels generated by module 108.

For example, determining the similarity scores can correspond to determining a relevance parameter that indicates a relevance between a conversational reply and an item of digital content received by server 106 from user device 102. Hence, similar to module 110, module 112 can also generate a confidence score based on a determined relevance parameter.

Module 112 can generate conversational replies using quotes, words or text phrases or other media content that are associated with particularly high similarity scores (e.g., as indicated by a corresponding relevance parameter for the similarity score). Such high similarity scores can indicate that these quotes, words or text phrases have substantial relevance to the labels generated module 108.

Similarity scores for media content items accessed from database 220 can be ranked based on a numerical value of the score such that scores with larger numerical values (e.g., high similarity scores) are ranked higher than scores with lower numerical values (e.g., low similarity scores). Conversational replies generated from media content items of database 220 that have high similarity scores may be assigned higher confidence scores relative to conversational replies generated from media content items of database 220 that have low similarity scores.

Module 112 can generate a set of conversational replies and each conversational reply in the set can have a corresponding confidence score. Further, module 112 can use logic 222 to rank each conversational reply in the set based on the corresponding confidence score for the reply.

For example, module 112 can generate a second set of conversational replies relative to the example first set generated by module 110. This example second set of conversational replies can include: i) a first reply that includes text stating "wow the Eiffel tower looks really tall up close, don't you think?", where the text is a quote from a song by a singer and the reply further includes an image of the singer standing in front of the Eiffel tower; ii) a second reply that includes text stating "Paris has so many cool places that surround the tower," where the text is a quote from a movie and the reply further includes an image from a scene of the movie that shows the Eiffel tower and multiple buildings that surround the tower; and iii) a third reply that includes text stating "Paris has nice places to visit around the Eiffel tower," where the text is a quote from a web-based article.

Further, regarding this second set of conversational replies, the first reply might receive an example confidence score of 0.88, the second reply might receive an example confidence score of 0.7, and the third reply might receive an example confidence score of 0.2. The second set of conversational replies can include: a) the first reply being ranked highest, e.g., ranked first out of the three replies, based on the confidence score of 0.88; b) the second reply being ranked between the first reply and the third reply, e.g., ranked second out of the three replies, based on the confidence score of 0.7; and c) the third reply being ranked after the first reply and the second reply, e.g., ranked third or last out of the three replies, based on the confidence score of 0.2.

As described in more detail below, a set of conversational replies generated by module 112, and the corresponding confidence scores for each reply, are provided to module 116 for analysis and selection of a particular conversational reply from among multiple conversational replies. In some implementations, the example second set of conversational replies described above can be provided to module 116 along with ranking data that indicates a ranking of a particular conversational reply relative to other replies in the second set.

Predetermined replies module 114 generally includes machine learning logic 226, predetermined replies database 228, and scoring/ranking logic 230. Module 114 can receive one or more labels from module 108 that indicate attributes of an item of digital content received by server 106 from user device 102.

Predetermined replies database 228 can include multiple predetermined conversational replies and at least one conversational reply generated by module 112 can be selected from among the multiple predetermined conversational replies of database 228. The predetermined replies can be curated such that each predetermined conversational reply stored in database 228 includes at least a portion of text/ words, text phrases, or image content that may have a likelihood of being perceived as delightful, pleasing, pleasant, or interesting to a user.

Module 114 can generate one or more conversational replies based on a similarity between labels received from module 108 and at least one content item stored in database 228. The content item can include one or more of: i) words/text included in predetermined replies stored in database 228; ii) text phrases included in predetermined replies stored in database 228; and iii) predetermined replies stored in database 228.

For example, referencing the above extracted features for the Eiffel tower and the dog, one or more labels can include text phrases or words such as "Eiffel tower" and "cocker spaniel." Module 114 can then scan or analyze database 228 to identify predetermined replies or other content items relating to texts, words, or text phrases that have an apparent relation to "Eiffel tower" or "cocker spaniel."

Predetermined replies, words, or text phrases of database 228 can be content items, e.g., a string of curated text/words forming snippets of descriptive and interesting content, that have been drafted using computer-based or human reply drafters. The predetermined replies, words, or text phrases stored in database 228 can include content items such as: "Eiffel tower," "Paris," "wow the Eiffel tower seems really cool, I'd like to visit Paris," "cocker spaniel," "that cocker spaniel seems really small compared to the Eiffel," or "I am no architect, but the Eiffel tower seems like quite a construction!" Thus, at least one content item of database 228 can be related to, substantially related to, or descriptive of, particular items depicted in a digital image received from user device 102.

In some implementations, module 114 uses machine learning logic 226 to compute inferences using an example neural network of system 100. The computed inferences are used to determine content items of database 228 that are similar or relevant to the labels generated by module 108, and that indicate an attribute of the item of digital content received from user device 102.

Module 114 can use scoring/ranking logic 230 to determine at least one similarity score that indicates a similarity between: i) the one or more labels indicating an attribute of an item of digital content; and ii) at least one content item that includes predetermined replies stored in database 228. For example, module 114 can determine a similarity score between a label including "Eiffel tower" and respective predetermined replies, words, or text phrases relating to Eiffel tower accessed from database 228.

In some implementations, module 114 can execute program code for data matching and data comparison processes such as entity matching, n-gram similarity, phrase matching, and feature similarity, to indicate a threshold level of similarity between labels provided by module 108 and predetermined replies or other content items accessed from database 228. Module 114 can then generate a similarity score based on an outcome of the data matching process.

Module 114 can also determine whether similarity scores exceed a threshold similarity score. In response to determining that one or more similarity scores exceed a threshold similarity score, module 114 can generate one or more conversational replies and a confidence score (described below) for each conversational reply. Module 114 generates the conversational replies based on at least one content item (e.g., a word or text phrases included in a predetermined reply) accessed from database 228.

In some implementations, conversational replies generated by module 114 can include various combinations of content items accessed from database 228. For example, module 114 can generate a conversational reply that is the same as, similar to, or substantially similar to, a predetermined reply stored in database 228.

In some instances, module 114 generates a conversational reply by modifying an existing predetermined reply to include one or more words or text phrases from another predetermined reply of database 228. In related instances, module 114 generates a conversational reply by using individual words or text phrases from existing predetermined replies to form new replies that are then stored in database 228 as new predetermined replies.

Referring now to the confidence scores, module 114 can analyze one or more determined similarity scores and, based on this analysis, generate respective confidence scores for each conversational reply. Each conversational reply can be assigned a confidence score that indicates a relevance between the conversational reply and labels from module 108 that indicate an attribute of the received item of digital content. In some implementations, determined similarity scores can indicate an extent to which a content item of database 228 is similar or relevant to the labels generated by module 108.

For example, determining the similarity scores can correspond to determining a relevance parameter that indicates a relevance between a conversational reply and an item of digital content received by server 106 from user device 102. Hence, similar to modules 110 and 112, module 114 can also generate a confidence score based on a determined relevance parameter.

Module 114 can generate conversational replies using words or text phrases that are associated with particularly high similarity scores (e.g., as indicated by a corresponding relevance parameter for the similarity score). Such high similarity scores can indicate that these words or text phrases have substantial relevance to the labels generated module 108. Similarity scores for content items accessed from database 228 can be ranked based on a numerical value of the score such that scores with larger numerical values (e.g., high similarity scores) are ranked higher than scores with lower numerical values (e.g., low similarity scores).

Conversational replies generated from content items of database 228 that have high similarity scores may be assigned higher confidence scores relative to conversational replies generated from content items of database 228 that have low similarity scores.

Module 114 can generate a set of conversational replies and each conversational reply in the set can have a corresponding confidence score. Further, module 114 can use logic 230 to rank each conversational reply in the set based on the corresponding confidence score for the reply.

For example, module 114 can generate a third set of conversational replies relative to the example first and second sets generated by modules 110 and 112, respectively. This example third set of conversational replies can include: i) a first reply that includes predetermined reply text stating "I am no architect, but the Eiffel tower seems like quite a construction!"; and ii) a second reply that includes predetermined reply text stating "wow the Eiffel tower seems really cool, I'd like to visit Paris."

Further, regarding this third set of conversational replies, the first reply might receive an example confidence score of 0.92 and the second reply might receive an example confidence score of 0.65. The third set of conversational replies can include: a) the first reply being ranked highest, e.g., ranked first out of the two replies, based on the confidence score of 0.92; and b) the second reply being ranked after the first reply, e.g., ranked second out of the two replies, based on the confidence score of 0.65.

As described in more detail below, a set of conversational replies generated by module 114, and the corresponding confidence scores for each reply, are provided to module 116 for analysis and selection of a particular conversational reply from among multiple conversational replies. In some implementations, the example third set of conversational replies described above can be provided to module 116 along with ranking data that indicates a ranking of a particular conversational reply relative to other replies in the third set.

Reply selection module 116 receives respective sets of conversational replies generated by each of modules 110, 112, and 114. For each set of conversational replies, module 116 can also receive respective confidence scores for each conversational reply in the set as well as any associated ranking data that indicates of ranking of confidence scores.

Module 116 can include program code or logic to analyze the respective confidence scores, and ranking data, for each conversational reply in the sets of conversational replies generated by each of modules 110, 112, and 114. In some implementations, analyzing the respective confidence scores includes ranking each conversational reply based on the corresponding confidence score for the reply. Conversational replies can be ranked based on a numerical value of their associated confidence score such that replies having scores with larger numerical values (e.g., high confidence scores) are ranked higher than replies having scores with lower numerical values (e.g., low confidence scores).

In other implementations, module 116 can assign a weighting or boosting parameter to at least one of modules 110, 112, 114. The weighting parameter can be used to boost numerical values of confidence scores for conversational replies generated by the module that was assigned the weighting parameter. Conversational replies generated by a module 110, 112, 114 that was assigned a particular weighting parameter can be ranked higher relative to replies generated by another module 110, 112, 114 that was not assigned a particular weighting or boosting parameter.

Based on analysis of the respective confidence scores, module 116 can select a particular number of conversational replies from among the replies included in the respective sets of replies generated by modules 110, 112, and 114. Module 116 can select one or more conversational replies that have the highest confidences among the replies included in the respective sets of replies.

For example, referencing the above described first, second, and third sets of conversational replies, module 116 can select the first reply of the third set of conversational replies generated by module 114 and that has a corresponding confidence score of 0.92. Likewise, module 116 can also select the first reply of the second set of conversational replies generated by module 112 and that has a corresponding confidence score of 0.88. Module 116 selects the first reply of the third set based on the reply's corresponding confidence score of 0.92 being the highest among scores for all replies of the respective sets. Further, module 116 selects the first reply of the second set based on the reply's corresponding confidence score of 0.88 being the second highest among scores for all replies of the respective sets.

One or more conversational replies selected by module 116 are provided for output to user device 102 by server 106. For example, server 106 can provide the selected first reply of the third set based on the reply's corresponding confidence score of 0.92 being the highest among scores for all replies of the respective sets. In some implementations, selected conversational replies can be provided to user device 102 as a suggested reply to an item of digital content provided to server 106 from user device 102. In other implementations, the selected conversational reply can be provided to user device 102 in response to user device 102 receiving an item of digital content as a communication message of an electronic conversation generated by a messaging application.

For example, user device 102 may include a messaging application used to exchange data communications between at least two users that are associated with an electronic conversation. The messaging application can receive a communication message that includes an item of digital content, e.g., a digital image. User device 102 can provide the digital image to server 106 and server 106 can generate a conversational reply based on the digital image and according to the technologies described herein.

Server 106 provides the generated conversational reply for output to user device 102. User device 102 may suggest or output the conversational reply as a reply message to the communication message of the electronic conversation. User device 102 suggests the conversational reply to at least one user as a reply message to the communication message of the electronic conversation. Further, user device 102 outputs the conversational reply via a graphical display of the device that presents a graphical interface showing the electronic conversation.

Entity relatedness module 232 receives one or more labels from module 108 that indicate attributes of an item of digital content received by server 106 from user device 102. In response to receiving a label, module 232 can access knowledge graph 234 and use the label to generate one or more related entities that have a threshold relevance to the item of digital content.

At least one of modules 110, 112, 114 can receive one or more related entities from module 232 and use the related entities to generate one or more conversational replies. For example, predetermined replies module 112 can generate one or more conversational replies based on a similarity between: i) labels received from module 108 and at least one content item stored in database 228; and ii) one or more related entities received from module 232 and at least one content item stored in database 228.

For example, referencing the above extracted features for the Eiffel tower and the dog, one or more labels can include text phrases or words such as "Eiffel tower" and "cocker spaniel." Module 232 can then use knowledge graph 234 to identify related entities such as content items including texts, words, or text phrases that have an apparent relation to "Eiffel tower" or "cocker spaniel." Example related entities provided by graph 234 can include content items such as: "Paris," "Paris, France," "English spaniel," or "American spaniel."

Thus, at least one content item of knowledge graph 234 can be an entity that is related to, or substantially related to, a label generated by module 108. Further, at least one of modules 110, 112, 114 can generate one or more conversational replies based on a similarity between two or more of: i) labels received from module 108, ii) image pixel data received from module 108, iii) related entities received from module 232, or iv) content items stored in a respective database of the module.

Module 114 can use scoring/ranking logic 230 to determine at least one similarity score that indicates a similarity between two or more of: i) labels received from module 108, ii) image pixel data received from module 108, iii) related entities received from module 232, or iv) content items stored in a respective database of the module. Module 114 can also determine whether the similarity scores exceed a threshold similarity score.

In response to determining that the similarity score exceeds a threshold similarity score, module 114 can generate one or more conversational replies and a confidence score for each conversational reply. Module 114 can generate the conversational replies based on the related entity and based on at least one content item (e.g., a word or text phrases included in a predetermined reply) accessed from database 228. In some implementations, in response to determining that the similarity score exceeds a threshold similarity score, module 114 can select, from database 228, a content item or a predetermined conversational reply for inclusion with one or more conversational replies generated by modules 110 and 112 of system 100.

Knowledge graph 234 is a collection of data representing entities and relationships between entities. The data is logically described as a graph, in which each distinct entity is represented by a respective node and each relationship between a pair of entities is represented by an edge between the nodes. Each edge is associated with a relationship and the existence of the edge represents that the associated relationship exists between the nodes connected by the edge. For example, if a node A represents a person alpha, a node B represents a person beta, and an edge E is associated with the relationship "is the father of," then having the edge E connect the nodes in the direction from node A to node B in the graph represents the fact that alpha is the father of beta.

A knowledge graph can be represented by any of a variety of convenient physical data structures. For example, a knowledge graph can be represented by triples that each represent two entities in order and a relationship from the first to the second entity; for example, [alpha, beta, is the father of], or [alpha, is the father of, beta], are alternative ways of representing the same fact. Each entity and each relationship can be and generally will be included in multiple triples.

Alternatively, each entity can be stored as a node once, as a record or an object, for example, and linked through a linked list data structure to all the relationships the entity has and all the other entities to which the entity is related. More specifically, a knowledge graph can be stored as an adjacency list in which the adjacency information includes relationship information. It is generally advantageous to represent each distinct entity and each distinct relationship with a unique identifier.

The entities represented by a knowledge graph need not be tangible things or specific people. The entities can include particular people, places, things, artistic works, concepts, events, or other types of entities. Thus, a knowledge graph can include data defining relationships between people, e.g., co-stars in a movie; data defining relationships between people and things, e.g., a particular singer recorded a particular song; data defining relationships between places and things, e.g., a particular type of wine comes from a particular geographic location; data defining relationships between people and places, e.g., a particular person was born in a particular city; and other kinds of relationships between entities.

In some implementations, each node has a type based on the kind of entity the node represents; and the types can each have a schema specifying the kinds of data that can be maintained about entities represented by nodes of the type and how the data should be stored. So, for example, a node of a type for representing a person could have a schema defining fields for information such as birth date, birth place, and so on. Such information can be represented by fields in a type-specific data structure, or by triples that look like node-relationship-node triples, e.g., [person identifier, was born on, date], or in any other convenient predefined way. Alternatively, some or all of the information specified by a type schema can be represented by links to nodes in the knowledge graph; for example, [one person identifier, child of, another person identifier], where the other person identifier is a node in the graph.

Figure 3:
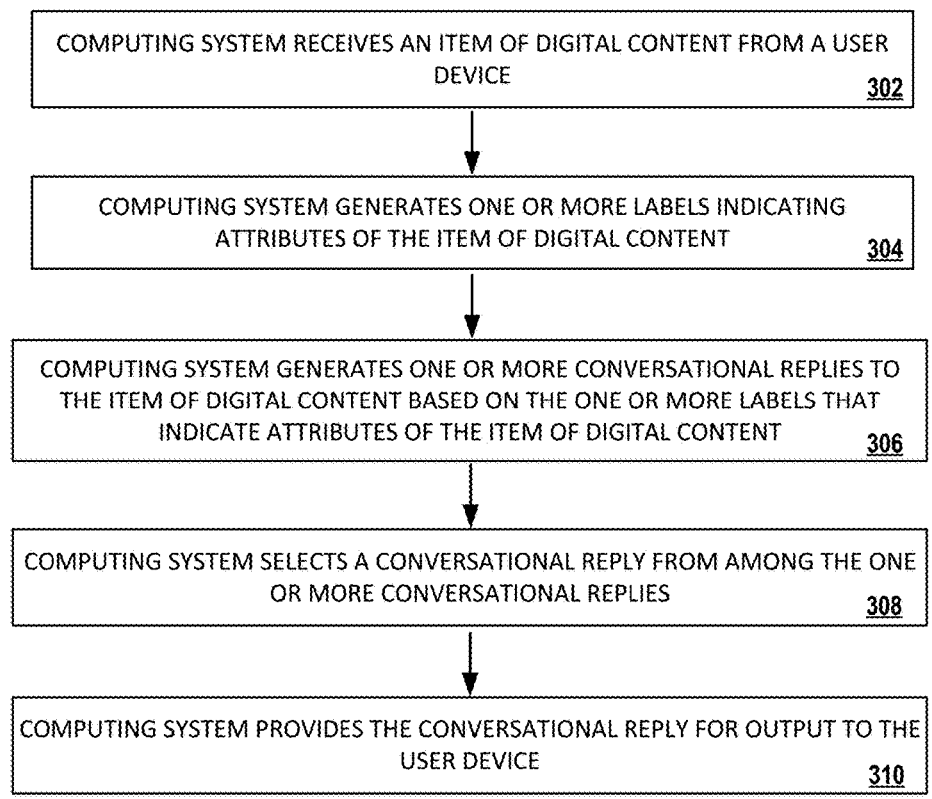
FIG. 3 is a flow diagram of an example process for generating one or more conversational replies.

FIG. 3 is a flow diagram of an example process 300 for generating one or more conversational replies. In some implementations, process 300 may be performed or executed by one or more electronic devices, modules, or components of system 100 described above.

At block 302 of process 300, server 106 of system 100 receives an item of digital content from user device 102. The item of digital content can include a digital image that depicts a particular item. At block 304, system 100 generates one or more labels that indicate attributes of the item of digital content or that describe characteristics of the particular item. For example, image recognition module 108 can execute program code to analyze the digital image of the item of digital content. In response to analyzing the digital image, module 108 can extract one or more features of the image and use the extracted features to generate the one or more labels that indicate attributes of the item of digital content.

At block 306 of process 300, system 100 generates one or more conversational replies to the item of digital content based on the one or more labels that at least indicate attributes of the item of digital content. For example, server 106 can use one or more of modules 110, 112, or 114 to generate the one or more conversational replies based on at least one label generated by module 108. In some implementations, rather than generating conversational replies based on the one or more labels, system 100 can instead use module 110 to generate conversational replies based on image data of the item of digital content.

At block 308, system 100 selects a conversational reply from among the one or more conversational replies that are generated by the one or more modules of server 106. System 100 can use reply selection module 116 to select a particular conversational reply from among multiple conversational replies that are generated by at least one module of server 106. At block 310 of process 300, system 100 can cause server 106 provide the selected conversational reply for output to user device 102.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus.

Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system.

A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 4:
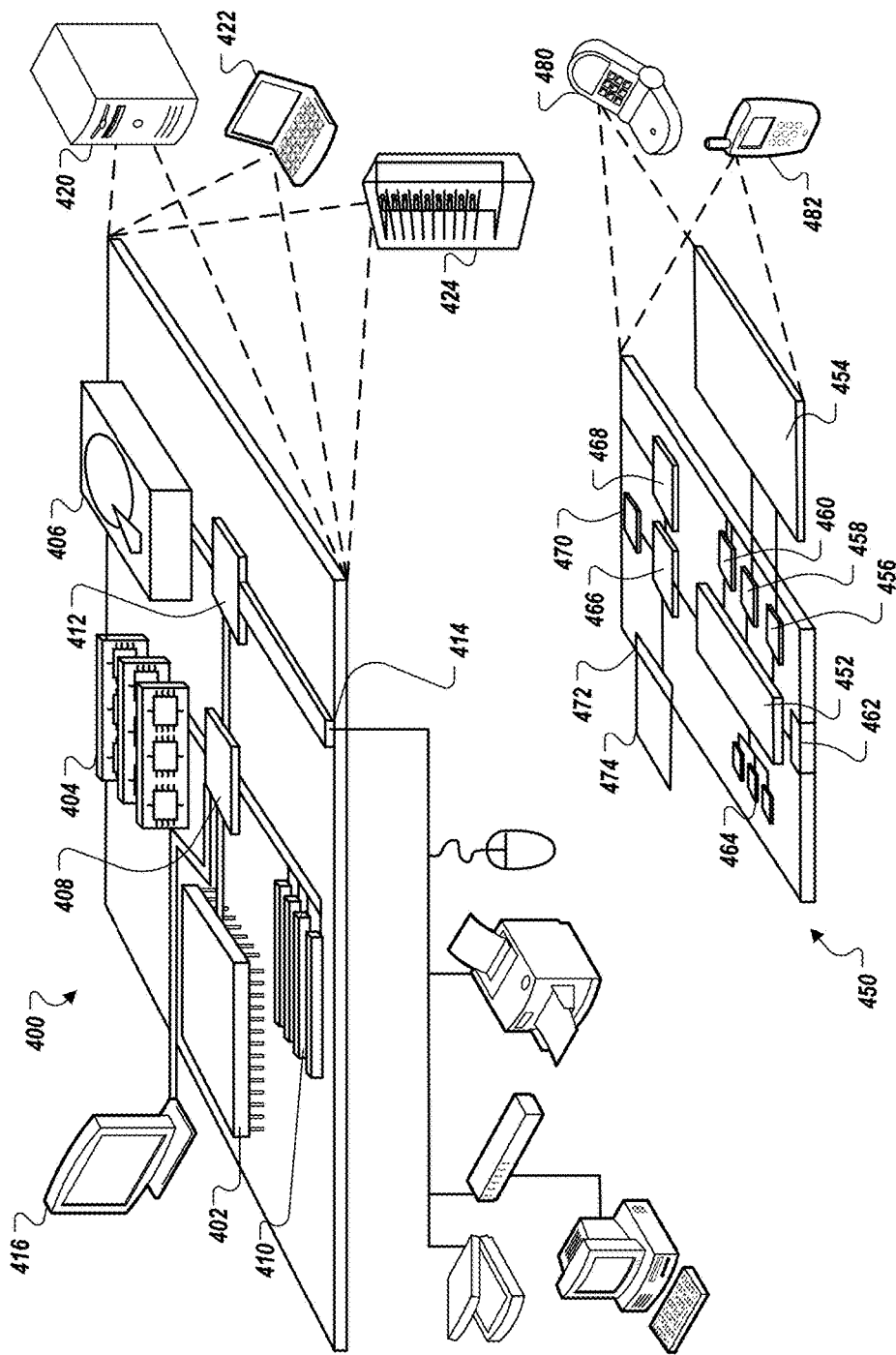
FIG. 4 is a block diagram of a computing system that can be used in connection with computer-implemented methods described in this specification.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 606, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication, e.g., via a docking procedure, or for wireless communication, e.g., via Bluetooth or other such technologies.

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound, e.g., voice messages, music files, etc., and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
   receiving, by an automated conversational assistant system that is configured to conduct an automated conversation with a user and from a user device, an image;
   generating, by the automated conversational assistant system, one or more image labels and a corresponding score for each image label, wherein each image label is descriptive of a feature depicted in the image and each score indicates a prominence of the feature relative to other features depicted in the image;
   selecting, by the automated conversational assistant system and from the one or more image labels, a particular image label that corresponds to a prominent feature depicted in the image based on the score for the particular image label exceeding a threshold score;
   based on the particular image label that corresponds to the prominent feature of the image, generating, by the automated conversational assistant system, one or more conversational replies to the image using past conversations between multiple users, predetermined conversational replies, and quotations from media content;
   selecting, by the automated conversational assistant system and from among the one or more conversational replies, a conversational reply based on a relationship between content of each of the one or more conversational replies and the particular image label; and
   providing, for output by the automated conversational assistant system and to the user device, the conversational reply.

2. The method of claim 1, wherein generating the one or more conversational replies comprises:
   determining, by at least one module, a similarity score that indicates a similarity between the image and an item of digital content that is associated with an electronic conversation; and
   responsive to the similarity score exceeding a threshold similarity score, generating, by the at least one module and based on the item of digital content, the one or more conversational replies and a confidence score for each conversational reply of the one or more conversational replies; and
   wherein selecting the conversational reply comprises: selecting, from among the one or more conversational replies, a particular conversational reply based on the confidence score for the particular conversational reply.

3. The method of claim 1, wherein generating the one or more conversational replies comprises:
   analyzing, by at least one module, content of a content database comprising multiple items of media content, wherein the content is associated with at least one item of media content;
   determining, by the at least one module, a similarity score that indicates a similarity between the particular image label and the analyzed content; and
   responsive to the similarity score exceeding a threshold similarity score, generating, by the at least one module and based on a particular item of media content, the one or more conversational replies and a confidence score for each conversational reply of the one or more conversational replies; and
   wherein selecting the conversational reply comprises: selecting, from among the one or more conversational replies, a particular conversational reply based on the confidence score for the particular conversational reply.

4. The method of claim 1, wherein generating the one or more conversational replies comprises:

determining, by at least one module, a first similarity score that indicates a similarity between the particular image label and a predetermined conversational reply of a reply content database; and responsive to the first similarity score exceeding a threshold similarity score, generating, by the at least one module and based on a particular predetermined conversational reply, the one or more conversational replies and a confidence score for each conversational reply of the one or more conversational replies; and wherein selecting the conversational reply comprises: selecting, from among the one or more conversational replies, a particular conversational reply based on the confidence score for the particular conversational reply.

5. The method of claim 4, wherein generating the one or more conversational replies further comprises:

determining, by the at least one module and based on the particular image label, a related entity that has a threshold relevance to the image, wherein the related entity is determined using a knowledge graph;

determining, by the at least one module, a second similarity score that indicates a similarity between the particular image label, the determined related entity, and the particular predetermined conversational reply; and responsive to the second similarity score exceeding a threshold similarity score, selecting by the at least one module, a predetermined conversational reply for inclusion with the one or more conversational replies generated by the automated conversational assistant system.

6. The method of claim 5, wherein obtaining the related entity that has the threshold relevance to the image comprises:

accessing, by the automated conversational assistant system, the knowledge graph that includes nodes that each represent an entity and edges that each represent a relationship between a pair of nodes; and obtaining, by the automated conversational assistant system and from the knowledge graph, the related entity that has the threshold relevance to the image based on a similarity between the particular image label and entity-pairs that correspond to nodes and edges of the knowledge graph.

7. The method of claim 6, wherein obtaining the related entity that has the threshold relevance to the image comprises:

determining, by the knowledge graph, a measure of similarity between the particular image label and multiple distinct entity-pairs that each correspond to a node and edge of the knowledge graph, wherein the measure of similarity indicates a relevance of each entity-pair to the image; and identifying, by the knowledge graph, the related entity of an entity-pair having a corresponding measure of similarity that indicates the related entity has the threshold relevance to the image.

8. The method of claim 1, wherein generating the one or more conversational replies comprises at least one of:

generating, by a first module of the automated conversational assistant system, a first conversational reply and generating a first confidence score for the first conversational reply; and generating, by a second module of the automated conversational assistant system, a second conversational reply and generating a second confidence score for the second conversational reply.

9. The method of claim 8, wherein generating the first confidence score for the first conversational reply by the first module comprises:

determining a first relevance parameter that indicates a relevance between the first conversational reply and the image; and generating the first confidence score based on the first relevance parameter.

10. The method of claim 8, wherein generating the second confidence score for the second conversational reply by the second module comprises:

determining a second relevance parameter that indicates a relevance between the second conversational reply and the particular image label; and generating the second confidence score based on the second relevance parameter.

11. The method of claim 1, wherein the method further comprises:

selecting a particular number of conversational replies from among the one or more conversational replies based on respective confidence scores of the one or more conversational replies; and providing, for output by the user device, the particular number of conversational replies as a suggested reply to the image received by the automated conversational assistant system.

12. The method of claim 11, wherein providing the conversational reply selected from among the one or more conversational replies comprises:

the automated conversational assistant system receiving the image as a communication message of an electronic conversation generated by a messaging application, the electronic conversation including at least one user;

providing the particular number of conversational replies as a suggested reply message to the communication message of the electronic conversation; and receiving, by the automated conversational assistant system, an indication that the at least one user selected a conversational reply from among the particular number of conversational replies as a reply message to the communication message of the electronic conversation.

13. The method of claim 1, wherein generating the one or more image labels and the corresponding score for each image label comprises:

generating a respective boundary box for one or more features depicted in the image, each boundary box being configured to bound a respective feature in the image; and generating an image label and a corresponding score for each feature that is bounded by a respective boundary box, wherein the corresponding score indicates a prominence of the feature based on a relevance of the image label to the feature bounded by a respective boundary box.

14. An electronic system comprising:

one or more processing devices;

one or more non-transitory machine-readable storage devices for storing instructions that are executable by the one or more processing devices to cause performance of operations comprising:

receiving, by an automated conversational assistant system that is configured to conduct an automated conversation with a user and from a user device, an image;

generating, by the automated conversational assistant system, one or more image labels and a corresponding score for each image label, wherein each image label is descriptive of a feature depicted in the image and each score indicates a prominence of the feature relative to other features depicted in the image;

selecting, by the automated conversational assistant system and from the one or more image labels, a particular image label that corresponds to a prominent feature depicted in the image based on the score for the particular image label exceeding a threshold score;

based on the particular image label that corresponds to the prominent feature of the image, generating, by the automated conversational assistant system, one or more conversational replies to the image using past conversations between multiple users, predetermined conversational replies, and quotations from media content;

selecting, by the automated conversational assistant system and from among the one or more conversational replies, a conversational reply based on a relationship between content of each of the one or more conversational replies and the particular image label; and providing, for output by the automated conversational assistant system and to the user device, the conversational reply.

15. The electronic system of claim 14, wherein generating the one or more conversational replies comprises:
    determining, by at least one module, a similarity score that indicates a similarity between the image and an item of digital content that is associated with an electronic conversation; and
    responsive to the similarity score exceeding a threshold similarity score, generating, by the at least one module and based on the item of digital content, the one or more conversational replies and a confidence score for each conversational reply of the one or more conversational replies; and
    wherein selecting the conversational reply comprises: selecting, from among the one or more conversational replies, a particular conversational reply based on the confidence score for the particular conversational reply.

16. The electronic system of claim 14, wherein generating the one or more conversational replies comprises:
    analyzing, by at least one module, content of a content database comprising multiple items of media content, wherein the content is associated with at least one item of media content; and
    determining, by the at least one module, a similarity score that indicates a similarity between the particular image label and the analyzed content; and
    responsive to the similarity score exceeding a threshold similarity score, generating, by the at least one module and based on a particular item of media content, the one or more conversational replies and a confidence score for each conversational reply of the one or more conversational replies; and
    wherein selecting the conversational reply comprises: selecting, from among the one or more conversational replies, a particular conversational reply based on the confidence score for the particular conversational reply.

17. The electronic system of claim 14, wherein generating the one or more conversational replies comprises:
    determining, by at least one module, a first similarity score that indicates a similarity between the particular image label and a predetermined conversational reply of a reply content database; and
    responsive to the first similarity score exceeding a threshold similarity score, generating, by the at least one module and based on a particular predetermined conversational reply, the one or more conversational replies and a confidence score for each conversational reply of the one or more conversational replies; and
    wherein selecting the conversational reply comprises: selecting, from among the one or more conversational replies, a particular conversational reply based on the confidence score for the particular conversational reply.

18. The electronic system of claim 17, wherein generating the one or more conversational replies further comprises:
    determining, by the at least one module and based on the particular image label, a related entity that has a threshold relevance to the image, wherein the related entity is determined using a knowledge graph;
    determining, by the at least one module, a second similarity score that indicates a similarity between the particular image label, the determined related entity, and the particular predetermined conversational reply; and
    responsive to the second similarity score exceeding a threshold similarity score, selecting by the at least one module, a predetermined conversational reply for inclusion with the one or more conversational replies generated by the automated conversational assistant system.

19. The electronic system of claim 14, wherein generating the one or more conversational replies comprises at least one of:
    generating, by a first module of the automated conversational assistant system, a first conversational reply and generating a first confidence score for the first conversational reply; and
    generating, by a second module of the automated conversational assistant system, a second conversational reply and generating a second confidence score for the second conversational reply.

20. One or more non-transitory machine-readable storage devices storing instructions that are executable by one or more processing devices to cause performance of operations comprising:
    receiving, by an automated conversational assistant system that is configured to conduct an automated conversation with a user and from a user device, an image;
    generating, by the automated conversational assistant system, one or more image labels and a corresponding score for each image label, wherein each image label is descriptive of a feature depicted in the image and each score indicates a prominence of the feature relative to other features depicted in the image;
    selecting, by the automated conversational assistant system and from the one or more image labels, a particular image label that corresponds to a prominent feature depicted in the image based on the score for the particular image label exceeding a threshold score;
    based on the particular image label that corresponds to the prominent feature of the image, generating, by the automated conversational assistant system, one or more conversational replies to the image using past conversations between multiple users, predetermined conversational replies, and quotations from media content;
    selecting, by the automated conversational assistant system and from among the one or more conversational replies, a conversational reply based on a relationship between content of each of the one or more conversational replies and the particular image label; and providing, for output by the automated conversational assistant system and to the user device, the conversational reply.

* * * * *

UNITED STATES PATENT AND TRADEMARK OFFICE
CERTIFICATE OF CORRECTION

Page 1 of 1

PATENT NO. : 10,341,272 B2
APPLICATION NO. : 15/587783
DATED : July 2, 2019
INVENTOR(S) : Ibrahim Badr It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 72 days.

Signed and Sealed this
Twenty-sixth Day of May, 2020

Andrei Iancu
*Director of the United States Patent and Trademark Office*